(12) United States Patent  
Chen et al.

(10) Patent No.: US 8,456,582 B2  
(45) Date of Patent: Jun. 4, 2013

(54) ACTIVE DEVICE, PIXEL STRUCTURE AND DISPLAY PANEL

(75) Inventors: Yu-Cheng Chen, Hsinchu (TW); Yi-Hui Li, Taipei County (TW); Chih-Hung Lin, Taoyuan County (TW); Maw-Song Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 222 days.

(21) Appl. No.: 13/030,133

(22) Filed: Feb. 18, 2011

(65) Prior Publication Data

US 2012/0057090 A1 Mar. 8, 2012

(30) Foreign Application Priority Data

Sep. 7, 2010 (TW) .............................. 99130234 A

(51) Int. Cl.  
*G02F 1/1343* (2006.01)

(52) U.S. Cl.  
USPC ............................................................ 349/38

(58) Field of Classification Search  
USPC ............................................................ 349/38  
See application file for complete search history.

(56) References Cited

U.S. PATENT DOCUMENTS

2007/0103610 A1* 5/2007 Lee et al. ........................ 349/38  
2009/0141222 A1 6/2009 Hsu et al.

* cited by examiner

*Primary Examiner* — Phu Vu  
(74) *Attorney, Agent, or Firm* — Jianq Chyun IP Office

(57) ABSTRACT

An active device, a pixel structure, and a display panel are provided. The pixel structure includes a scan line, a data line, an active device, a gate insulating layer, a pixel electrode, a capacitor electrode, and a capacitor dielectric layer. The active device includes a gate, a channel, a source, and a drain. The gate is electrically connected to the scan line. The source is electrically connected to the data line. The gate insulating layer is disposed between the gate and the channel. The pixel electrode is electrically connected to the drain. The capacitor electrode is located on the gate insulating layer. The capacitor dielectric layer is located between the capacitor electrode and the drain.

20 Claims, 8 Drawing Sheets

ACTIVE DEVICE, PIXEL STRUCTURE AND DISPLAY PANEL

CROSS-REFERENCE TO RELATED APPLICATION

This application claims the priority benefit of Taiwan application serial no. 99130234, filed on Sep. 7, 2010. The entirety of the above-mentioned patent application is hereby incorporated by reference herein and made a part of this specification.

BACKGROUND OF THE INVENTION

1. Field of the Invention

The present invention relates to an active device, a pixel structure having the active device, and a display panel having the pixel structures.

2. Description of Related Art

In general, a pixel structure of a liquid crystal display (LCD) includes an active device and a pixel electrode. The active device serves as a switch element of an LCD display unit. To control each individual pixel structure, a certain pixel is usually selected by a corresponding scan line and a corresponding data line, and display data corresponding to the certain pixel are displayed through providing an appropriate operating voltage. The pixel structure further includes a storage capacitor, such that the pixel structure can be equipped with voltage-retaining functions. Namely, the storage capacitor can store the applied operating voltage to stabilize the display image of the pixel structure.

To form the storage capacitor in the pixel structure, a capacitor electrode is often required in the pixel structure. However, if the area of the capacitor electrode is expanded in order to increase the capacitance of the storage capacitor, the aperture ratio of the pixel structure is reduced.

At present, the capacitor electrode is designed to be located below the data line in the pixel structure according to the related art, so as to increase the aperture ratio of the pixel structure. The capacitor electrode and the data line that are overlapped to increase the loading of the pixel structure, and thereby the power supply for driving the display panel needs to be increased, which leads to an increase in power consumption.

SUMMARY OF THE INVENTION

The present invention is directed to an active device, a pixel structure having the active device, and a display panel, wherein a capacitor electrode is designed to ensure the high aperture ratio of the pixel structure without increasing the loading of the pixel structure.

The present invention provides a pixel structure that includes a scan line, a data line, an active device, a gate insulating layer, a pixel electrode, a capacitor electrode, and a capacitor dielectric layer. The active device includes a gate, a channel, a source, and a drain. The gate is electrically connected to the scan line, and the source is electrically connected to the data line. The gate insulating layer is located between the gate and the channel. The pixel electrode is electrically connected to the drain. The capacitor electrode is disposed on the gate insulating layer. The capacitor dielectric layer is located between the capacitor electrode and the drain.

The present invention further provides a display panel that includes a plurality of said pixel structures.

The present invention further provides an active device that includes a gate, a channel, a gate insulating layer, a source, a drain, a capacitor electrode, and a capacitor dielectric layer. The gate insulating layer is located between the gate and the channel. The source and the drain are located above the channel. The capacitor electrode is disposed on the gate insulating layer. The capacitor dielectric layer is located between the capacitor electrode and the drain.

Based on the above, the capacitor electrode of the present invention is located on the gate insulating layer, and the capacitor dielectric layer is located between the capacitor electrode and the drain. Hence, the capacitor electrode and the drain together constitute a capacitor. A relatively thin insulating layer can be disposed between the capacitor electrode and the drain, and therefore the area of the capacitor region in the pixel structure can be reduced by placing the pixel electrode. As such, the pixel structure can have the desired aperture ratio. On the other hand, the capacitor coupling portion of the capacitor electrode is not overlapped with the data line in the present invention, and therefore the design of the capacitor electrode does not increase the loading of the pixel structure.

In order to make the aforementioned and other features and advantages of the present invention comprehensible, embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
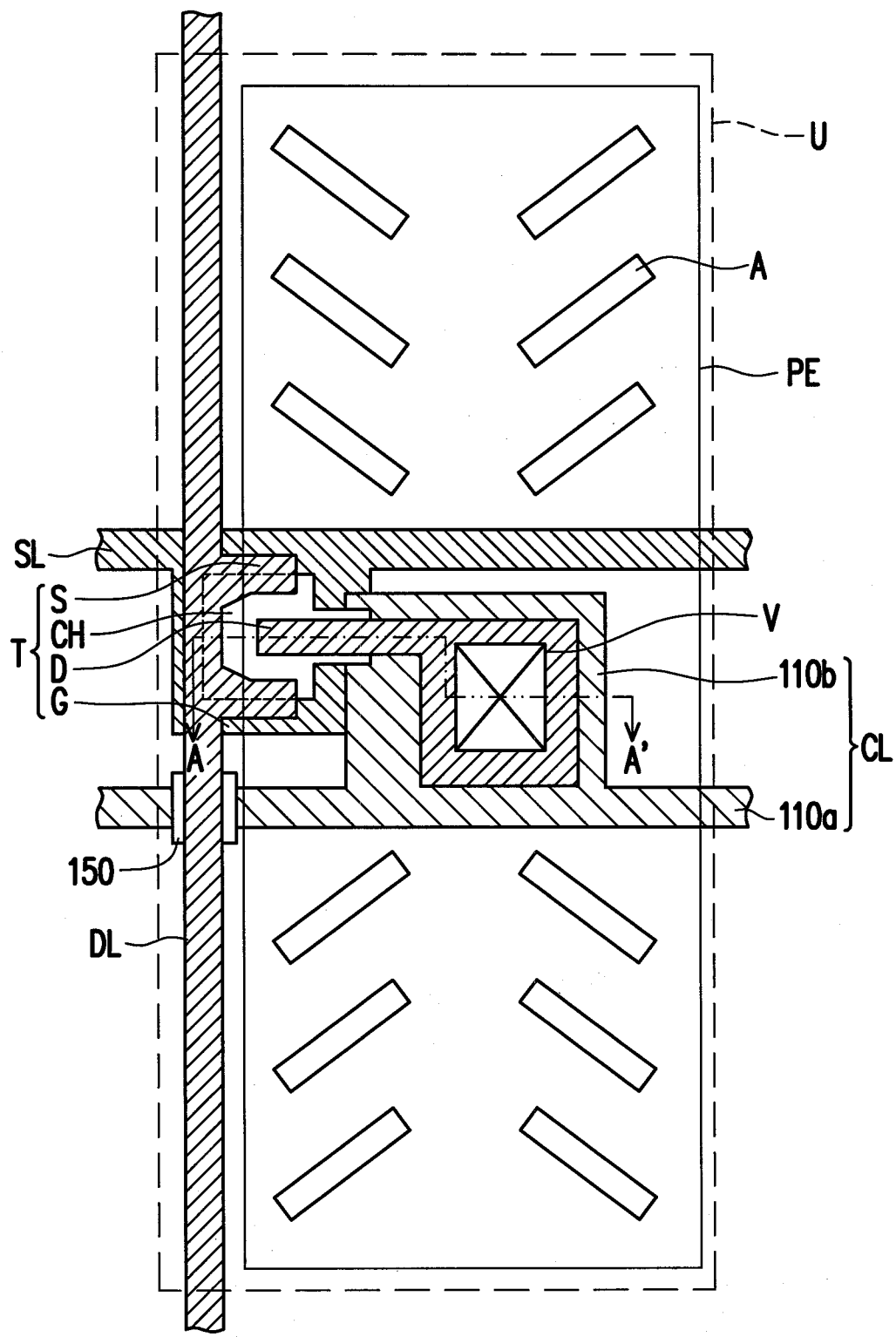
FIG. 1A is a schematic top view illustrating a pixel structure according to an embodiment of the present invention.
Figure 1B:
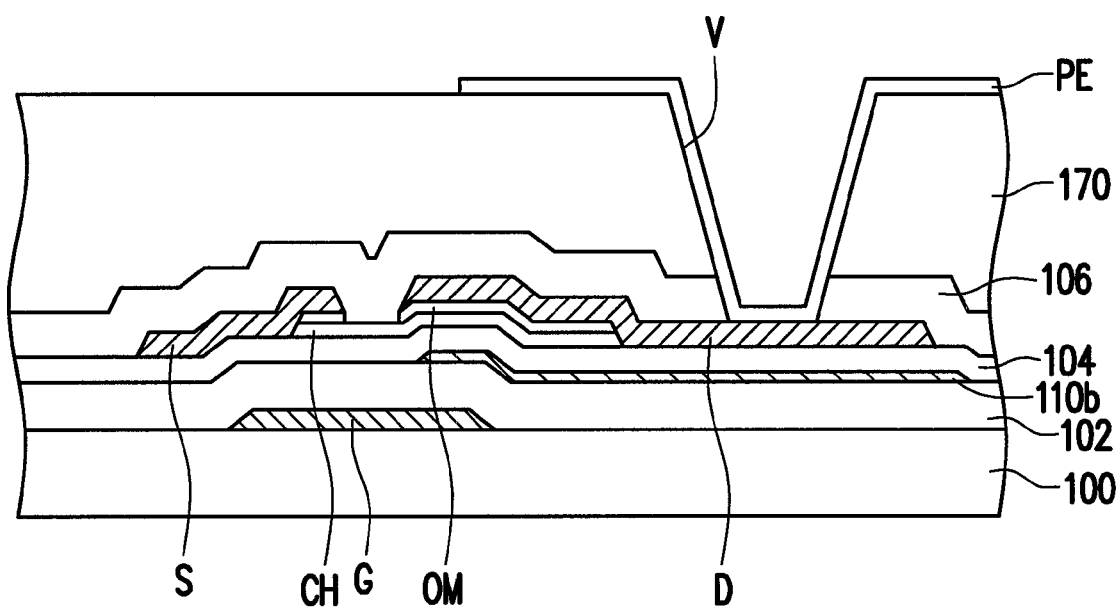
FIG. 1B is a schematic cross-sectional view taken along a sectional line A-A' depicted in FIG. 1A.

FIG. 1A is a schematic top view illustrating a pixel structure according to an embodiment of the present invention. FIG. 1B is a schematic cross-sectional view taken along a sectional line A-A' depicted in FIG. 1A. With reference to FIG. 1A and FIG. 1B, the pixel structure of this embodiment includes a substrate 100 on which a scan line SL, a data line DL, an active device T, gate insulating layer 102, a pixel electrode PE, and a capacitor electrode CL, and a capacitor dielectric layer 104 are disposed.

The substrate 100 has a pixel region U thereon, and each pixel region U has a pixel structure therein. The substrate 100 can be made of glass, quartz, an organic polymer, a non-lighttransmissive/reflective material (such as a conductive material, wafer, ceramics, or any other suitable material), or any other suitable material. The scan line SL and the data line DL are disposed on the substrate 100.

The scan line SL crosses over the data line DL. In other words, an extending direction of the data line DL is not parallel to an extending direction of the scan line SL. Preferably, the extending direction of the data line DL is substantially perpendicular to the extending direction of the scan line SL. In addition, the scan line SL and the data line DL are in different film layers. In consideration of electrical conductivity, the scan line SL and the data line DL are normally made of metallic materials. However, the present invention is not limited thereto. According to other embodiments, the scan line SL and the data line DL can also be made of other conductive materials. The metallic material is, for example, an alloy, metal nitride, metal oxide, metal oxynitride, another appropriate material, or a layer in which the metal material and any other conductive material are stacked to each other.

The active device T includes a gate G, a channel CH, a source S, and a drain D. The gate G is electrically connected to the scan line SL, and the source S is electrically connected to the data line DL. According to this embodiment, the gate G is disposed on the substrate 100, and the gate G and the scan line SL are in the same film layer. A material of the gate G is the same as or similar to the material of the scan line SL. The channel CH is located on the gate insulating layer 102 and capacitor dielectric layer 104 above the gate G. A material of the channel CH is, for instance, amorphous silicon, polysilicon, metal oxide semiconductor, or any other semiconductor material. The source S and the drain D are located at respective sides of the channel CH. In this embodiment, the source S, the drain D, and the data line DL are in the same film layer, and materials of the source S, the drain, and the data line DL are the same or similar. Given the channel CH is made of amorphous silicon in an embodiment of the present invention, an ohmic contact layer OM can be further placed between the channel CH and the source S and the drain D, and the channel CH can be made of doped amorphous silicon.

The capacitor electrode CL is substantially located above the gate G and below the drain D. That is to say, the film layer where the capacitor electrode CL is located is between the film layer where the gate G is located and the film layer where the drain D is located. In this embodiment, the capacitor electrode CL includes a connecting portion 110a and a capacitor coupling portion 110b. An overlapping region between the capacitor coupling portion 110b and the drain D is where the storage capacitor of the pixel structure is formed. Namely, the capacitor coupling portion 110b acts as the lower electrode of the storage capacitor, and the drain D acts as the upper electrode of the storage capacitor. Besides, the connecting portion 110a and the capacitor coupling portion 110b are connected, and the connecting portion 110a extends to the periphery of the substrate 110. The extended connecting portion 110a at the periphery of the substrate 110 is electrically connected to the common voltage Vcom. Similarly, in consideration of electrical conductivity, the capacitor electrode CL is normally made of metallic materials. However, the capacitor electrode CL can also be made of other conductive materials in other embodiments, which should not be construed as a limitation to the present invention. The metallic material is, for example, an alloy, metal nitride, metal oxide, metal oxynitride, another appropriate material, or a layer in which the metal material and any other conductive material are stacked to each other.

According to this embodiment, an extending direction of the connecting portion 110a of the capacitor electrode CL is substantially parallel to the extending direction of the scan line SL. An extending direction of the capacitor coupling portion 110b of the capacitor electrode CL is substantially perpendicular to the connecting portion 110a. In each of the pixel structures of the embodiment, the capacitor coupling portion 110b extends from the connecting portion 110a to the scan line SL. Besides, in this embodiment, the capacitor electrode CL is overlapped with a portion of the gate G. In detail, the capacitor coupling portion 110b of the capacitor electrode CL and the gate G are partially overlapped. The connecting portion 110a of the capacitor electrode CL and the data line DL are partially overlapped.

In this embodiment, a pad layer 150 can be further disposed at the overlapping region between the data line DL and the capacitor electrode CL. The pad layer 150, for instance, includes a channel material layer 150a and an ohmic contact material layer 150b (as indicated in FIG. 2B). That is to say, the channel material layer 150a is defined (formed) when the channel CH is formed, and the ohmic contact material layer 150b is defined (formed) when the ohmic contact layer OM is formed. The pad layer 150 disposed between the data line DL and the capacitor electrode CL can prevent current leakage that occurs in the overlapping region between the data line DL and the capacitor electrode CL. Note that the material of the pad layer 150 is not limited in the present invention. The pad layer 150 can also be made of other materials in other embodiments of the present invention.

According to this embodiment as shown in FIG. 1B, the capacitor dielectric layer 104 is further disposed between the gate G and the channel CH, and the capacitor dielectric layer 104 is located on the insulating layer 102. In addition, a capacitor dielectric layer 104 is further disposed between the capacitor electrode CL (the capacitor coupling portion 110b) and the drain D. The material of the insulating layer 102 and/or the capacitor dielectric layer 104 respectively includes silicon oxide, silicon nitride, silicon oxynitride, or any other appropriate dielectric material. Particularly, the thickness of the capacitor dielectric layer 104 is smaller than the thickness of the gate insulating layer 102. Here, the thickness of the capacitor dielectric layer 104 is about 700 angstroms to about 1500 angstroms, and the thickness of the gate insulating layer 102 is about 3300 angstroms to about 5100 angstroms, for instance.

The pixel electrode PE is electrically connected to the drain D of the active device T. Here, the pixel electrode PE can be a transparent pixel electrode, a reflective pixel electrode, or a combination thereof. A material of the transparent pixel electrode includes metal oxide, such as indium tin oxide (ITO), indium zinc oxide (IZO), aluminum tin oxide (ATO), aluminum zinc oxide (AZO), indium germanium zinc oxide, other suitable oxide, or a layer in which at least two of the above materials are stacked. A material of the reflective pixel electrode is a metallic material with high reflectivity, for instance.

According to this embodiment, the connecting portion 110a of the capacitor electrode CL and the pixel electrode PE are partially overlapped. The pixel electrode PE of this embodiment further includes a plurality of alignment patterns A, e.g., alignment slits. However, the present invention is not limited thereto. According to other embodiments of the present invention, the alignment patterns A may not be formed in the pixel electrode PE.

In this embodiment, as indicated in FIG. 1B, passivation layers 106 and 170 are further disposed between the pixel electrode PE and the active device T (the source S and the drain D). The passivation layers 106 and 170 have a contact opening V, such that the pixel electrode PE is electrically connected to the drain D. The passivation layer 106 is normally referred to as the protection layer and can be made of silicon oxide, silicon nitride, silicon oxynitride, or any other appropriate dielectric material. The passivation layer 170 is referred to as the planarization layer and can be made of an inorganic insulating material, an organic insulating material, or an organic photo-sensitive material, for instance.

Note that the data line DL in the pixel structure shown in FIG. 1A is disposed on the edge of the pixel region U. The scan line SL, the active device T, and the capacitor electrode CL are disposed in the middle of the pixel region U. However, the locations of the scan line SL, the data line DL, the active device T, and the capacitor electrode CL in the pixel region U are not limited in the present invention.

According to an embodiment of the present invention, the pad layer 150 can be further disposed at the overlapping region between the data line DL and the capacitor electrode CL. The pad layer 150 can be defined when the channel CH and the ohmic contact layer OM are formed. The pad layer 150 is disposed in order to prevent short circuit or current leakage at the overlapping region between the data line DL and the capacitor electrode CL.

In the pixel structure depicted in FIG. 1A and FIG. 1B, the capacitor coupling portion 110b of the capacitor electrode CL is overlapped with the channel CH or/and partially overlapped with the gate G. Since the capacitor coupling portion 110b of the capacitor electrode CL and the channel CH are overlapped, short circuit or current leakage between the capacitor coupling portion 110b of the capacitor electrode CL and the drain D can be better prevented by the channel CH.

Figure 2A:
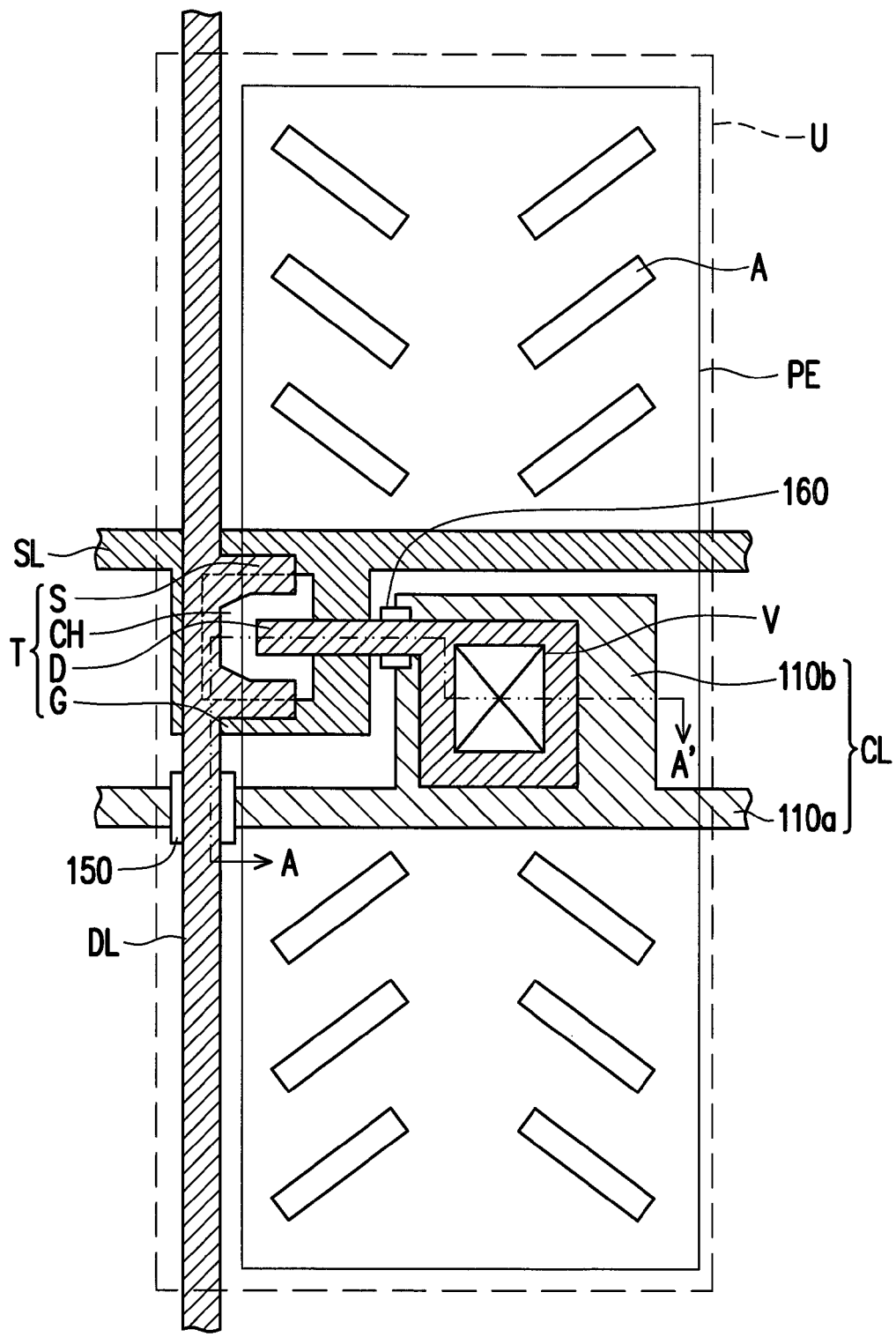
FIG. 2A is a schematic top view illustrating a pixel structure according to an embodiment of the present invention.
Figure 2B:
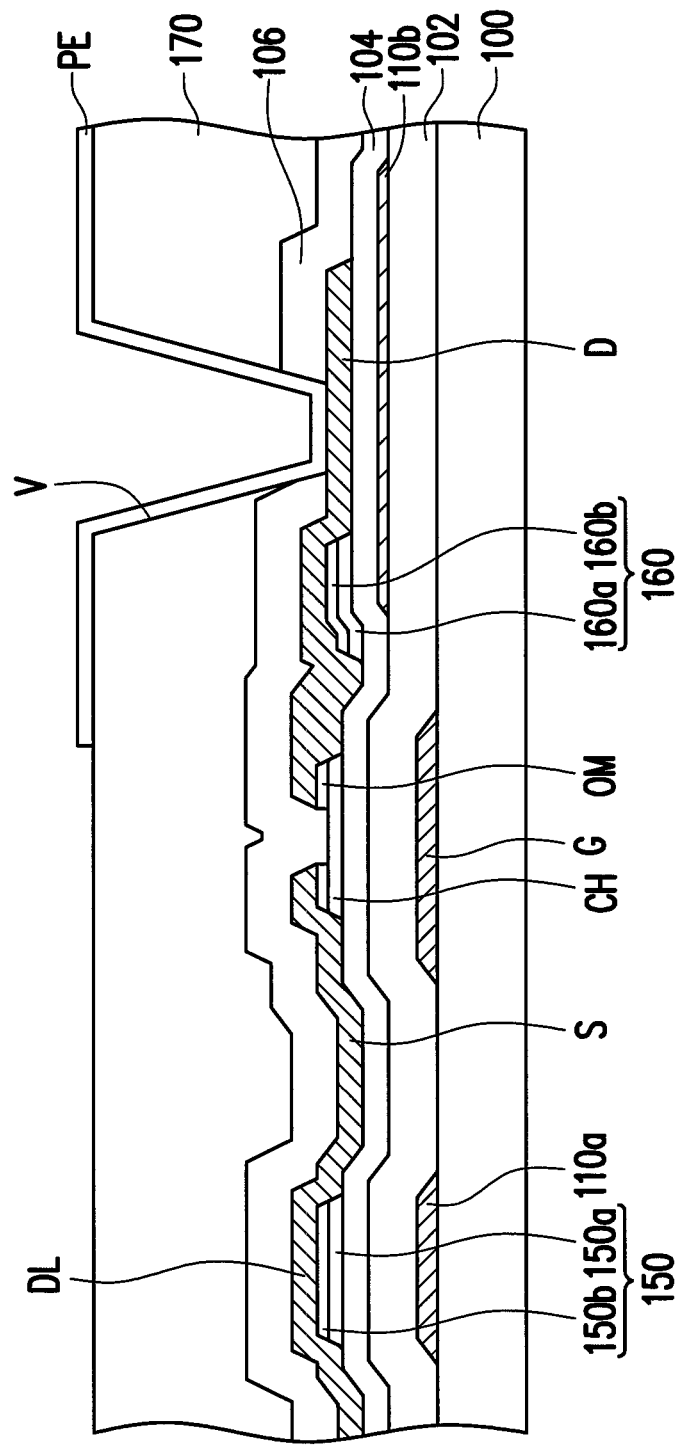
FIG. 2B is a schematic cross-sectional view taken along a sectional line A-A' depicted in FIG. 2A.

In other embodiments of the present invention, it is likely for the capacitor electrode not to be overlapped with the gate, as indicated in FIG. 2A and FIG. 2B. FIG. 2A is a schematic top view illustrating a pixel structure according to an embodiment of the present invention. FIG. 2B is a schematic cross-sectional view taken along a sectional line A-A' depicted in FIG. 2A.

The embodiment depicted in FIG. 2A and FIG. 2B is similar to the embodiment depicted in FIG. 1A and FIG. 1B; therefore, the same elements in FIG. 1A, FIG. 1B and FIG. 2A, FIG. 2B are represented by the same reference numbers and repetitive descriptions of these elements are omitted hereinafter. The difference between the embodiment depicted in FIG. 2A and FIG. 2B and the embodiment depicted in FIG. 1A and FIG. 1B lies in that the capacitor electrode CL is not overlapped with the gate G and the channel CH in this embodiment. In detail, the capacitor coupling portion 110b of the capacitor electrode CL is not overlapped with the gate G and the channel CH.

Since the capacitor coupling portion 110b of the capacitor electrode CL is not overlapped with the gate G and the channel CH, a pad layer 160 can be further disposed at the overlapping region between the drain D and the capacitor electrode CL. The pad layer 160 includes a lower pad layer 160a and an upper pad layer 160b. A material of the lower pad layer 160a is the same as the material of the channel CH, and a material of the upper pad layer 160b is the same as the material of the ohmic contact layer OM, for instance. The pad layer 160 disposed at the overlapping region between the drain D and the capacitor electrode CL can prevent short circuit or current leakage at the overlapping region.

According to the present embodiment, the capacitor electrode CL is located between the gate G and the drain D, and the overlapping region between the capacitor coupling portion 110b of the capacitor electrode CL and the drain D is where the storage capacitor of the pixel structure is formed. The gate G and the drain D of the active device T are located at the non-light-transmissive region. Hence, compared to the capacitor electrode in the conventional storage capacitor, the capacitor electrode CL of the present embodiment can ensure the desired aperture ratio of the pixel structure. Moreover, the capacitor electrode CL disposed between the gate G and the drain D is conducive to reduction of parasitic capacitance Cgd between the gate G and the drain D. Thereby, the coupling effect occurring between the gate G and the drain D can be mitigated, and the display quality of the image can be improved, e.g., flickers can be reduced.

In the present embodiment, the thickness of the capacitor dielectric layer 104 is about 700 angstroms to about 1500 angstroms and is much smaller than the thickness of the gate insulating layer 102. As a result, the capacitor dielectric layer 104 is thin enough, such that the storage capacitor can have sufficient storage capacitance even through the area of the capacitor electrode CL is reduced for the purpose of increasing the aperture ratio of the pixel structure.

The capacitor electrode CL is located between the gate G and the drain D and covers a portion of the gate G. Accordingly, the capacitor electrode CL can block light that comes from the back side of the substrate 100, e.g., the light of the backlight module, so as to effectively decrease the photo current leakage generated when the channel CH is irradiated by the light from the backlight source.

In the previous two embodiments, the capacitor coupling portion 110b of the capacitor electrode CL is located close to the active device T. However, the present invention is not limited thereto. In other embodiments of the present invention, the capacitor coupling portion 110b of the capacitor electrode CL can be disposed far away from the active device T, as indicated in FIG. 3A and FIG. 3B.

Figure 3A:
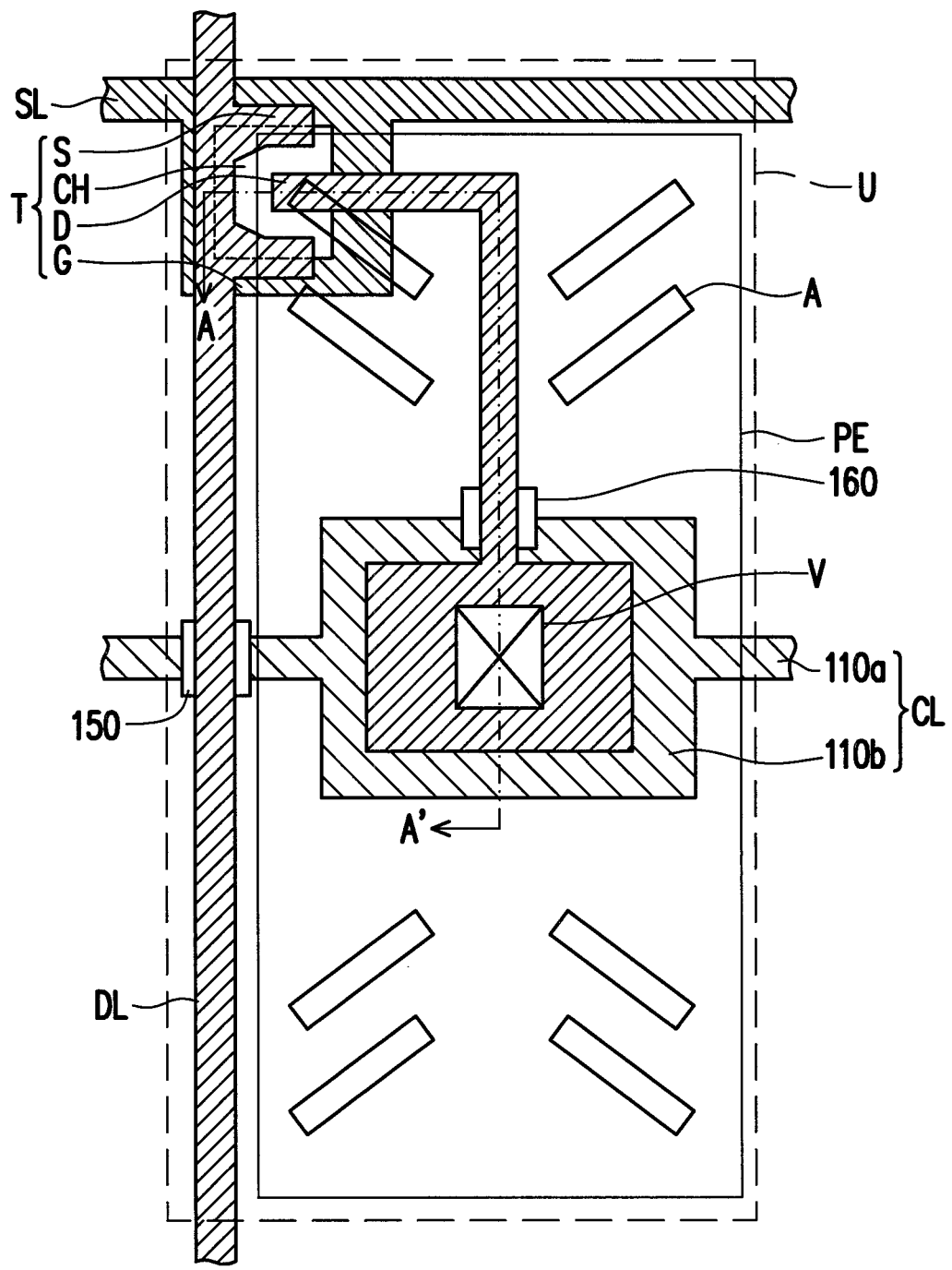
FIG. 3A is a schematic top view illustrating a pixel structure according to an embodiment of the present invention.
Figure 3B:
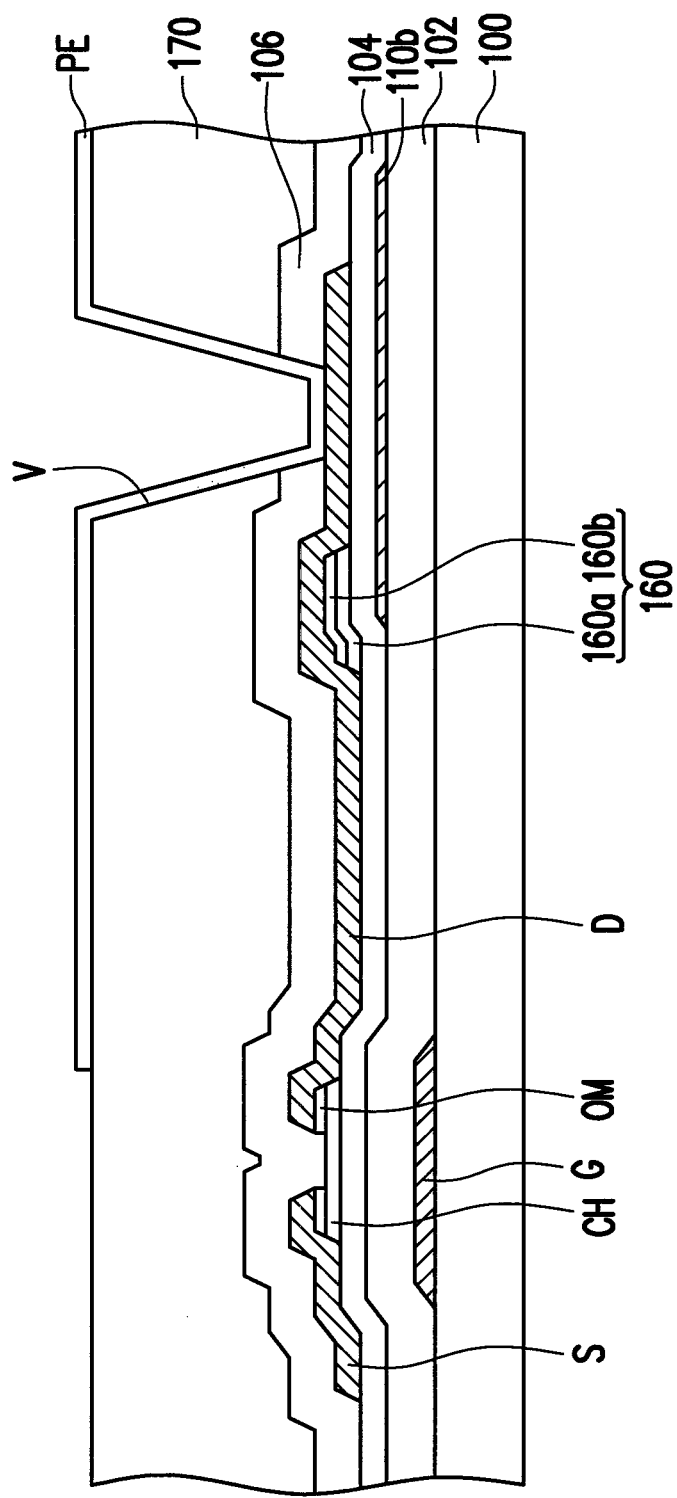
FIG. 3B is a schematic cross-sectional view taken along a sectional line A-A' depicted in FIG. 3A.

FIG. 3A is a schematic top view illustrating a pixel structure according to an embodiment of the present invention. FIG. 3B is a schematic cross-sectional view taken along a sectional line A-A' depicted in FIG. 3A. The embodiment depicted in FIG. 3A and FIG. 3B is similar to the embodiment depicted in FIG. 2A and FIG. 2B; therefore, the same elements in FIG. 2A, FIG. 2B and in FIG. 3A, FIG. 3B are represented by the same reference numbers, and repetitive descriptions of these elements are omitted hereinafter. The difference between the embodiment depicted in FIG. 3A and FIG. 3B and the embodiment depicted in FIG. 2A and FIG. 2B lies in that the active device T is disposed on the edge of the pixel region U, and the capacitor electrode CL is disposed in the middle of the pixel region U. Therefore, the capacitor electrode CL is not disposed close to the active device T.

Since the capacitor coupling portion 110b of the capacitor electrode CL is not overlapped with the gate G and the channel CH, the pad layer 160 can be further disposed at the overlapping region between the drain D and the capacitor electrode CL. The pad layer 160 includes a lower pad layer 160a and an upper pad layer 160b. A material of the lower pad layer 160a is the same as the material of the channel CH, and a material of the upper pad layer 160b is the same as the material of the ohmic contact layer OM, for instance. The pad layer 160 disposed at the overlapping region between the drain D and the capacitor electrode CL can prevent short circuit or current leakage at the overlapping region.

Figure 4:
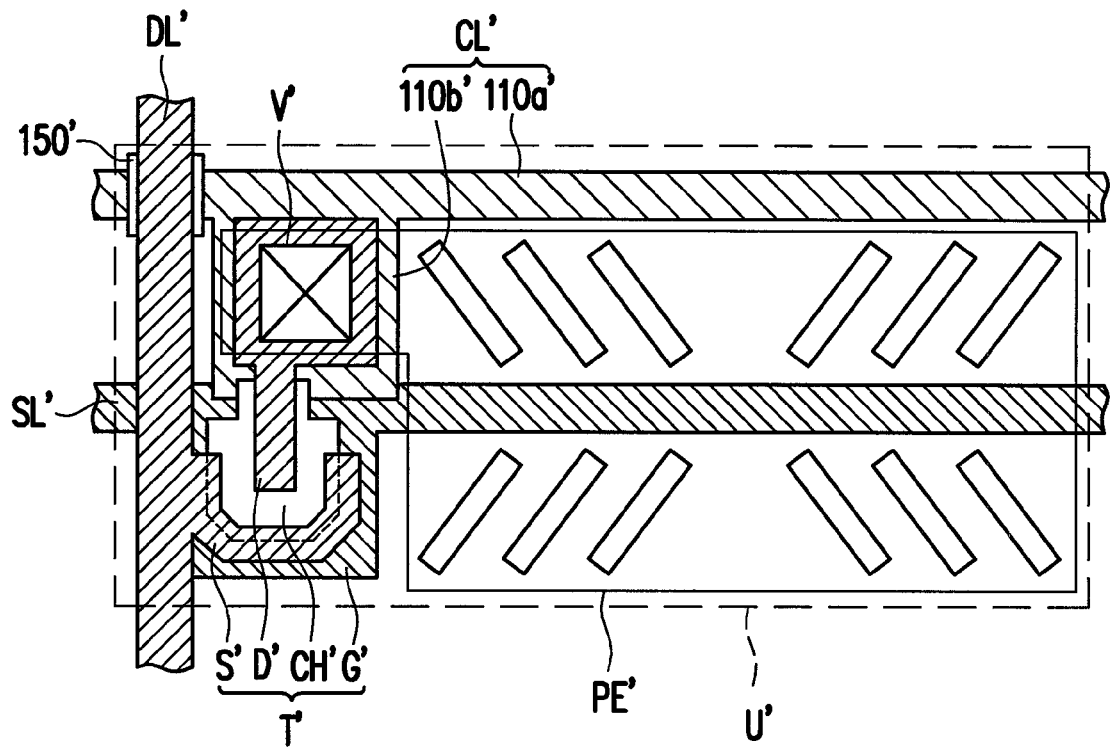
FIG. 4 is a schematic top view illustrating a pixel structure according to an embodiment of the present invention.

The design of the capacitor electrode CL between the gate G and the drain D can be further applied to other pixel structures in addition to the above-mentioned pixel structures, which is exemplarily shown in FIG. 4. The pixel structure depicted in FIG. 4 is similar to the pixel structure depicted in FIG. 1, while the main difference therebetween lies in that the pixel structure in FIG. 4 is a lateral pixel structure, and the scan line is in the middle of the pixel region and across the pixel region. The same elements in FIG. 1 and FIG. 4 are represented by the similar reference numbers.

With reference to FIG. 4, the pixel structure of this embodiment is in the pixel region U', and the pixel structure includes the scan line SL', the data line DL', the active device T', the pixel electrode PE', and the capacitor electrode CL'.

The scan line SL' crosses over the data line DL'. In other words, an extending direction of the data line DL' is not parallel to an extending direction of the scan line SL'. Preferably, the extending direction of the data line DL' is substantially perpendicular to the extending direction of the scan line SL'. A material of the scan line SL' and the data line DL' can be the same as or similar to the material of the scan line SL and the data line DL depicted in FIG. 1.

The active device T' includes a gate G', a channel CH', a source S', and a drain D'. The gate G' is electrically connected to the scan line SL', and the source S' is electrically connected to the data line DL'. Similarly, the materials of the gate G', the channel CH', the source S', and the drain D' can be the same as or similar to the materials of the gate G, the channel CH, the source S, and the drain D depicted in FIG. 1.

The capacitor electrode CL' is located between the gate G' and the drain D'. In this embodiment, the capacitor electrode CL' includes a connecting portion 110a' and a capacitor coupling portion 110b'. An overlapping region between the capacitor coupling portion 110b' and the drain D' is where the storage capacitor of the pixel structure is formed. Namely, the capacitor coupling portion 110b' acts as the lower electrode of the storage capacitor, and the drain D' acts as the upper electrode of the storage capacitor. The connecting portion 110a' is connected to the capacitor coupling portion 110b', and the connecting portion 110a' is electrically connected to the common voltage Vcom. The material of the capacitor electrode CL' can be the same as or similar to the material of the capacitor electrode CL depicted in FIG. 1.

Similarly, the extending direction of the connecting portion 110a' of the capacitor electrode CL' is substantially parallel to the extending direction of the scan line SL'. The extending direction of the capacitor coupling portion 110b' of the capacitor electrode CL' is substantially perpendicular to the connecting portion 110a'. In each of the pixel structures of this embodiment, the capacitor coupling portion 110b' extends from the connecting portion 110a' to the scan line SL'. Besides, according to this embodiment, the capacitor electrode CL' is overlapped with a portion of the gate G'. In detail, the capacitor coupling portion 110b' of the capacitor electrode CL' and the gate G' are partially overlapped. Additionally, the connecting portion 110a' of the capacitor electrode CL' and the data line DL' are partially overlapped.

In this embodiment, a pad layer 150' can be further disposed at the overlapping region of the data line DL' and the capacitor electrode CL'. The pad layer 150' includes the channel material layer and the ohmic contact material layer, for instance. The pad layer 150' disposed between the data line DL' and the capacitor electrode CL' can prevent current leakage that occurs in the overlapping region of the data line DL' and the capacitor electrode CL'.

The pixel electrode PE' is electrically connected to the drain D' of the active device T'. Here, the pixel electrode PE' can be a transparent pixel electrode, a reflective pixel electrode, or a combination thereof.

Similarly, in the pixel structure depicted in FIG. 4, the gate insulating layer is further disposed between the gate G' and the channel CH'. The capacitor dielectric layer is further disposed between the capacitor electrode CL' (the capacitor coupling portion 110b') and the drain D'. The thickness of the capacitor dielectric layer is about 700 angstroms to 1500 angstroms, and the thickness of the gate insulating layer is about 3300 angstroms to 5100 angstroms, for instance. The passivation layer is further disposed between the pixel electrode PE' and the active device T' (the source S' and the drain D'). The passivation layer has a contact opening V', such that the pixel electrode PE' is electrically connected to the drain D'.

In the embodiment depicted in FIG. 4, the capacitor electrode CL' is located between the gate G' and the drain D', and the overlapping region between the capacitor coupling portion 110b' of the capacitor electrode CL' and the drain D' is where the storage capacitor of the pixel structure is formed. The gate G' and the drain D' of the active device T' are located at the non-light-transmissive region. Hence, compared to the capacitor electrode in the conventional storage capacitor, the capacitor electrode CL' of this embodiment can ensure the desired aperture ratio of the pixel structure. Moreover, the capacitor electrode CL' disposed between the gate G' and the drain D' is conducive to reduction of parasitic capacitance Cgd between the gate G' and the drain D'. Thereby, the coupling effect occurring between the gate G' and the drain D' can be mitigated, and the display quality of the image can be improved, e.g., flickers can be reduced.

In this embodiment, the capacitor dielectric layer is thin enough, such that the storage capacitor can have sufficient storage capacitance even through the area of the capacitor electrode CL' is reduced for the purpose of increasing the aperture ratio of the pixel structure. The capacitor electrode CL' is located between the gate G' and the drain D' and covers a portion of the gate G'. Therefore, the capacitor electrode CL' can block light from the backlight module, so as to decrease the photo current leakage generated when the channel CH' is irradiated by the light from the backlight source.

In the pixel structures described in the above embodiments, the active devices are bottom-gate thin film transistors, for instance. However, the present invention is not limited thereto. In other embodiments of the present invention, the active devices of the pixel structures can also be top-gate thin film transistors, as described below.

Figure 5:
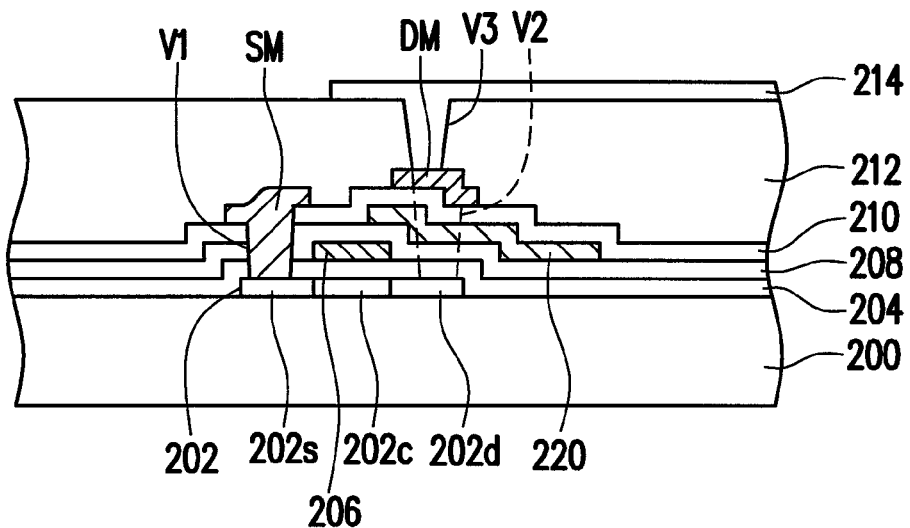
FIG. 5 is a schematic cross-sectional view illustrating a pixel structure according to an embodiment of the present invention.

FIG. 5 is a schematic cross-sectional view illustrating a pixel structure according to an embodiment of the present invention. With reference to FIG. 5, the active device of the pixel structure includes a polysilicon layer 202 that is disposed on the substrate 200, a gate 206, a gate insulating layer 204, an auxiliary dielectric layer 208, a capacitor dielectric layer 210, a source SM, a drain DM, a capacitor electrode 220, and a pixel electrode 214. The polysilicon layer 202, the gate 206, the source SM, and the drain DM together constitute the active device.

The polysilicon layer 202 has a source region 202s, a drain region 202d, and a channel region 202c. The source region 202s and the drain region 202d are n-type ion doped region or p-type ion doped region, for example.

The gate insulating layer 204 covers the polysilicon layer 202 and/or the substrate 200. The material of the gate insulating layer 204 includes silicon oxide, silicon nitride, silicon oxynitride, or any other appropriate dielectric material.

The gate 206 is disposed on the gate insulating layer 204 above the channel region 202c. The gate 206 is electrically connected to the scan line (not shown). The material of the gate 206 is, for example, metal, an alloy, metal nitride, metal oxide, metal oxynitride, another appropriate material, or a layer in which the metallic material and any other conductive material are stacked to each other.

The auxiliary dielectric layer 208 covers the gate 206 and the gate insulating layer 204. The material of the auxiliary layer 208 includes silicon oxide, silicon nitride, silicon oxynitride, or any other appropriate dielectric material.

The capacitor electrode 220 is disposed on the auxiliary dielectric layer 208. The material of the capacitor electrode 220 is, for example, metal, an alloy, metal nitride, metal oxide, metal oxynitride, another appropriate material, or a layer in which the metallic material and any other conductive material are stacked to each other.

The capacitor dielectric layer 210 covers the capacitor electrode 220. The material of the capacitor dielectric layer 210 includes silicon oxide, silicon nitride, silicon oxynitride, or any other appropriate dielectric material.

The source SM and the drain DM are disposed on the capacitor dielectric layer 210. The source SM is electrically connected to the data line (not shown). The source SM and the drain DM, for example, are made of metal, an alloy, metal nitride, metal oxide, metal oxynitride, another appropriate material, or a layer in which the metallic material and any other conductive material are stacked to each other. The source SM and the drain DM are electrically connected to the source region 202s and the drain region 202d respectively through contact openings V1 and V2. Namely, the contact openings V1 and V2 penetrate the capacitor dielectric layer 210, the auxiliary dielectric layer 208, and the gate insulating layer 204, such that the source SM and the drain DM can be electrically connected the source region 202s and the drain 202d respectively through the contact openings V1 and V2.

Specifically, the capacitor electrode 220 is located between the gate 206 and the drain DM. An overlapping region between the capacitor electrode 220 and the drain DM is where the storage capacitor of the pixel structure is formed. Namely, the capacitor electrode 220 acts as the lower electrode of the storage capacitor, and the drain DM acts as the upper electrode of the storage capacitor. The capacitor electrode 220 of this embodiment is located between the gate 206 and the drain DM, and the gate 206 and the drain DM are not light transmissive, for example. Therefore, thanks to the arrangement of the capacitor electrode 220 between the gate 206 and the drain DM, the area of the capacitor region of the pixel structure can be reduced. That is to say, compared to the capacitor electrode in the conventional storage capacitor, the capacitor electrode 220 of this embodiment can ensure the desired aperture ratio of the pixel structure. Moreover, since the capacitor electrode 220 in the present invention is disposed between the gate 206 and the drain DM, the parasitic capacitance Cgd between the gate 206 and the drain DM can be further reduced, so as to improve the image quality.

The passivation layer 212 covers the source SM and the drain DM. The material of the passivation layer 212 can be an inorganic insulating material (e.g., silicon nitride, silicon oxide, silicon oxynitride), an organic insulating material, an organic photo-sensitive material, or any other material.

The pixel electrode 214 is disposed on the passivation layer 212 and electrically connected to the drain DM through the contact opening V3. In other words, the contact opening V3 penetrates the passivation layer 212, such that the pixel electrode 214 is electrically connected to the drain DM through the contact opening V3.

Figure 6:
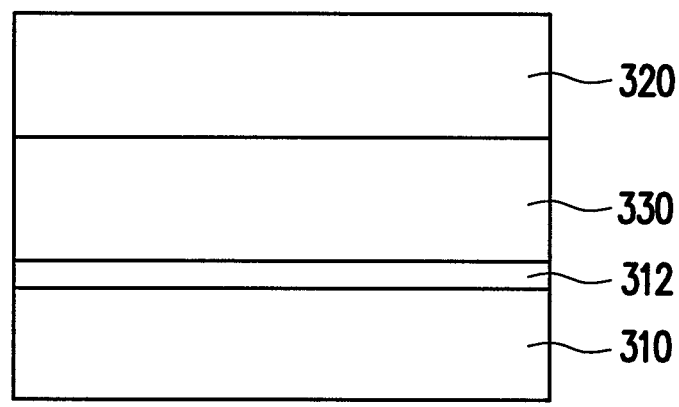
FIG. 6 is a schematic cross-sectional view illustrating a display panel according to an embodiment of the present invention.

FIG. 6 is a schematic cross-sectional view illustrating a display panel according to an embodiment of the present invention. With reference to FIG. 6, the display panel includes a first substrate 310, a pixel array 312, a second substrate 320, and a display medium 330. The pixel array 312 is disposed on the first substrate 310 and includes a plurality of pixel structures. Here, the pixel structures can be referred to as any of the pixel structures described in the embodiments shown in FIG. 1 to FIG. 5. The second substrate 320 can be a blank substrate, a color filter substrate, or a substrate on which an electrode layer is disposed. The display medium 330 can be liquid crystal molecules, an electrophoretic display medium, or any other suitable display medium.

In light of the foregoing, the present invention has at least following advantages:

The capacitor electrode is disposed between the gate and the drain in the present invention, so as not to reduce the area of the light transmissive region of the pixel structure. Hence, compared to the capacitor electrode in the conventional storage capacitor, the capacitor electrode of the present invention can ensure the desired aperture ratio of the pixel structure.

Moreover, since the capacitor electrode in the present invention is disposed between the gate and the drain, the parasitic capacitance Cgd between the gate and the drain can be further reduced, so as to improve the image quality.

On the other hand, the capacitor dielectric layer is thin enough, such that the storage capacitor can have sufficient storage capacitance even through the area of the capacitor electrode is reduced for the purpose of increasing the aperture ratio of the pixel structure.

Additionally, the capacitor electrode is located between the gate and the drain and covers a portion of the channel. Accordingly, the capacitor electrode can block light that comes from the back side of the substrate, e.g., the light of the backlight module, so as to effectively decrease the photo current leakage generated when the channel is irradiated by the light from the backlight source.

Further, since the capacitor coupling portion which does not occupy large area is not overlapped with the data line, said design of the capacitor electrode does not increase the loading of the pixel structure.

It will be apparent to those skilled in the art that various modifications and variations can be made to the present invention without departing from the scope or spirit of the present invention. In view of the foregoing, it is intended that the present invention cover modifications and variations of the present invention provided they fall within the scope of the following claims and their equivalents.

What is claimed is:

1. A pixel structure located on a substrate and comprising:
    a scan line and a data line;
    an active device including a gate, a channel, a source, and a drain, wherein the gate is electrically connected to the scan line, and wherein the source is electrically connected to the data line;
    a gate insulating layer located between the gate and the channel;
    a pixel electrode electrically connected to the drain;
    a capacitor electrode located on the gate insulating layer; and
    a capacitor dielectric layer located between the capacitor electrode and the drain,
    wherein a thickness of the capacitor dielectric layer is smaller than a thickness of the gate insulating layer, the thickness of the capacitor dielectric layer is about 700 angstroms to about 1500 angstroms, and the thickness of the gate insulating layer is about 3300 angstroms to about 5100 angstroms.

2. The pixel structure as claimed in claim 1, wherein the capacitor electrode includes:
    a capacitor coupling portion, wherein an overlapping region is located between the capacitor coupling portion and the drain together constituting a storage capacitor; and
    a connecting portion connected to the capacitor coupling portion.

3. The pixel structure as claimed in claim 2, wherein an extending direction of the connecting portion is substantially parallel to an extending direction of the scan line.

4. The pixel structure as claimed in claim 2, wherein the connecting portion and the pixel electrode are at least partially overlapped.

5. The pixel structure as claimed in claim 4, wherein the connecting portion and the data line are at least partially overlapped.

6. The pixel structure as claimed in claim 2, wherein the capacitor coupling portion is substantially perpendicular to the connecting portion.

7. The pixel structure as claimed in claim 1, wherein:
the substrate has a pixel region;
the data line is disposed on an edge of the pixel region;
the scan line, the active device, and the capacitor electrode are disposed in the middle of the pixel region; and
the pixel electrode has a plurality of alignment patterns.

8. The pixel structure as claimed in claim 1, further comprising:
a passivation layer located between the pixel electrode and the active device, the passivation layer having a contact opening, the pixel electrode being electrically connected to the drain through the contact opening.

9. The pixel structure as claimed in claim 1, wherein the capacitor electrode and the gate are not overlapped.

10. The pixel structure as claimed in claim 1, wherein the capacitor electrode is overlapped with the gate or the channel.

11. The pixel structure as claimed in claim 1, further comprising a passivation layer located between the pixel electrode and the active device.

12. The pixel structure as claimed in claim 11, further comprising an auxiliary dielectric layer located between the gate and the capacitor dielectric layer, the capacitor electrode being sandwiched between the auxiliary dielectric layer and the capacitor dielectric layer.

13. A display panel comprising a plurality of the pixel structures as claimed in claim 1.

14. An active device comprising:
a gate;
a channel;
a gate insulating layer located between the gate and the channel;
a source and a drain;
a capacitor electrode located on the gate insulating layer; and
a capacitor dielectric layer located between the capacitor electrode and the drain,
wherein a thickness of the capacitor dielectric layer is smaller than a thickness of the gate insulating layer, the thickness of the capacitor dielectric layer is about 700 angstroms to about 1500 angstroms, and the thickness of the gate insulating layer is about 3300 angstroms to about 5100 angstroms.

15. The active device as claimed in claim 14, wherein the capacitor electrode includes a capacitor coupling portion, wherein an overlapping region is located between the capacitor coupling portion and the drain together constitute a storage capacitor.

16. The active device as claimed in claim 14, wherein the capacitor electrode and the gate are not overlapped.

17. The active device as claimed in claim 14, wherein the capacitor electrode is overlapped with the gate or the channel.

18. The active device as claimed in claim 14, wherein the channel is located above the gate.

19. The active device as claimed in claim 14, further comprising an auxiliary dielectric layer located between the gate and the capacitor dielectric layer, the capacitor electrode being sandwiched between the auxiliary dielectric layer and the capacitor dielectric layer, the channel being located below the gate.

20. A pixel structure located on a substrate and comprising:
a scan line and a data line;
an active device including a gate, a channel, a source, and a drain, wherein the gate is electrically connected to the scan line, and wherein the source is electrically connected to the data line;
a gate insulating layer located between the gate and the channel;
a pixel electrode electrically connected to the drain;
a capacitor electrode located on the gate insulating layer;
a capacitor dielectric layer located between the capacitor electrode and the drain;
a passivation layer located between the pixel electrode and the active device; and
an auxiliary dielectric layer located between the gate and the capacitor dielectric layer, the capacitor electrode being sandwiched between the auxiliary dielectric layer and the capacitor dielectric layer.

* * * * *